United States Patent [19]
Cobey

[11] 3,733,033
[45] May 15, 1973

[54] COMPOST AND REFUSE SHREDDING AND SHIFTING APPARATUS

[76] Inventor: Herbert T. Cobey, P.O. Box 313, Crestline, Ohio 44827

[22] Filed: Mar. 22, 1971

[21] Appl. No.: 126,417

[52] U.S. Cl..............241/30, 241/101 M, 259/183, 56/345
[51] Int. Cl..............................................B02c 19/00
[58] Field of Search....................241/25, 27, 29, 30, 241/63, 64, 101 R, 101 M, 152, 154; 259/28, 183; 214/5; 56/344, 345, 346

[56] References Cited

UNITED STATES PATENTS

| | | | |
|---|---|---|---|
| 515,802 | 3/1894 | Storey | 56/346 X |
| 3,369,797 | 2/1968 | Cobey | 259/28 |
| 3,543,497 | 12/1970 | Engeler | 56/345 |

Primary Examiner—Granville Y. Custer, Jr.
Attorney—Wolfe, Hubbard, Leydig, Voit & Osann

[57] ABSTRACT

An improved apparatus for shredding, shifting and aerating organic wastes, refuse and other material that includes an endless web carrying a plurality of outwardly projecting elements which is moved in an upwardly and forwardly extending orbital path as the working face of the web engages the material and also includes a rotatable drum having outwardly extending elements that is positioned forwardly of the web near the lower portion of the orbital path. The plane of the web is adjustable relative to both the longitudinal and vertical axis of the chassis and the drum is vertically adjustable in a direction generally parallel to the plane of the upwardly moving web. In the preferred embodiment, the web and drum are supported from a self-propelled chassis.

20 Claims, 6 Drawing Figures

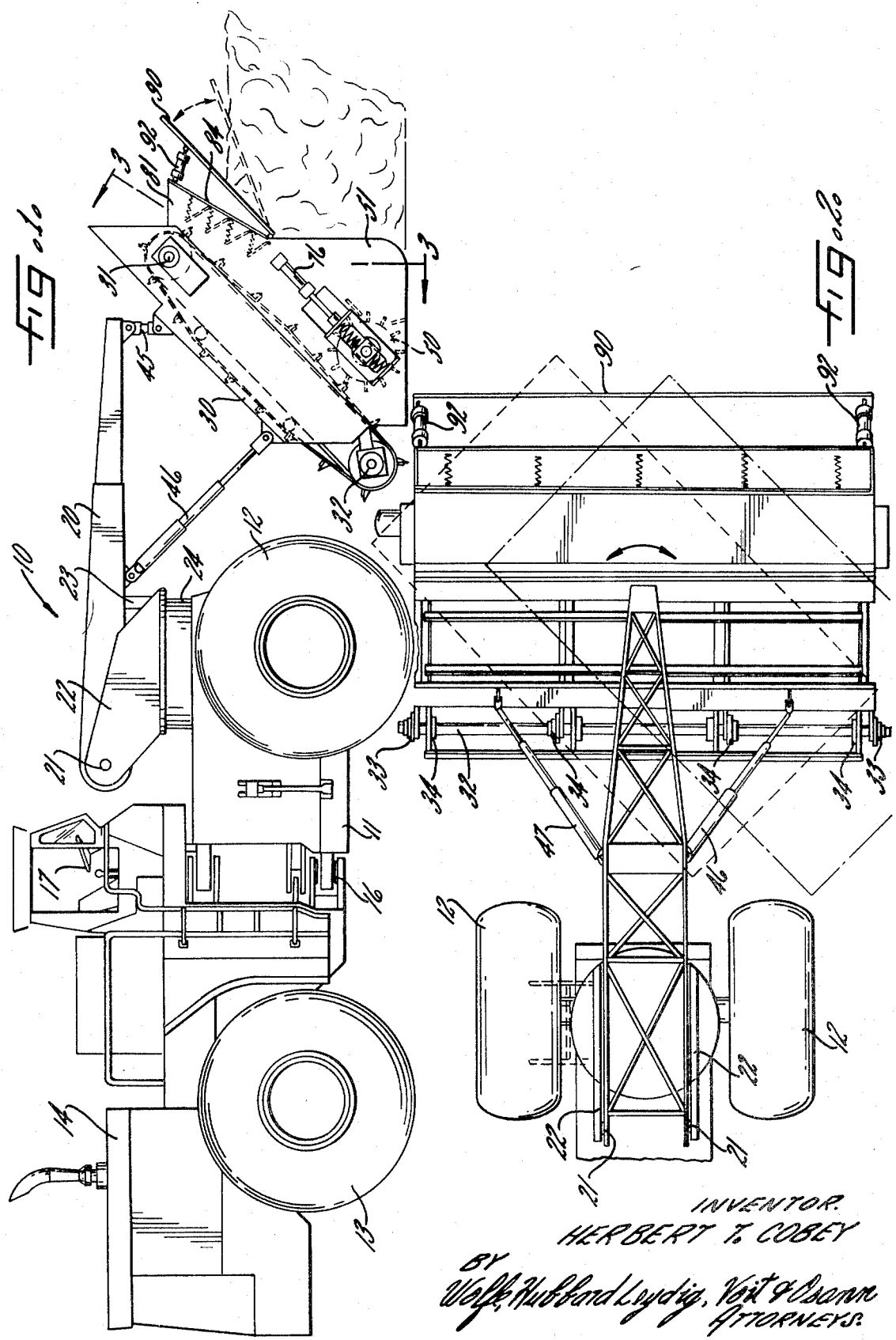

INVENTOR.
HERBERT T. COBEY

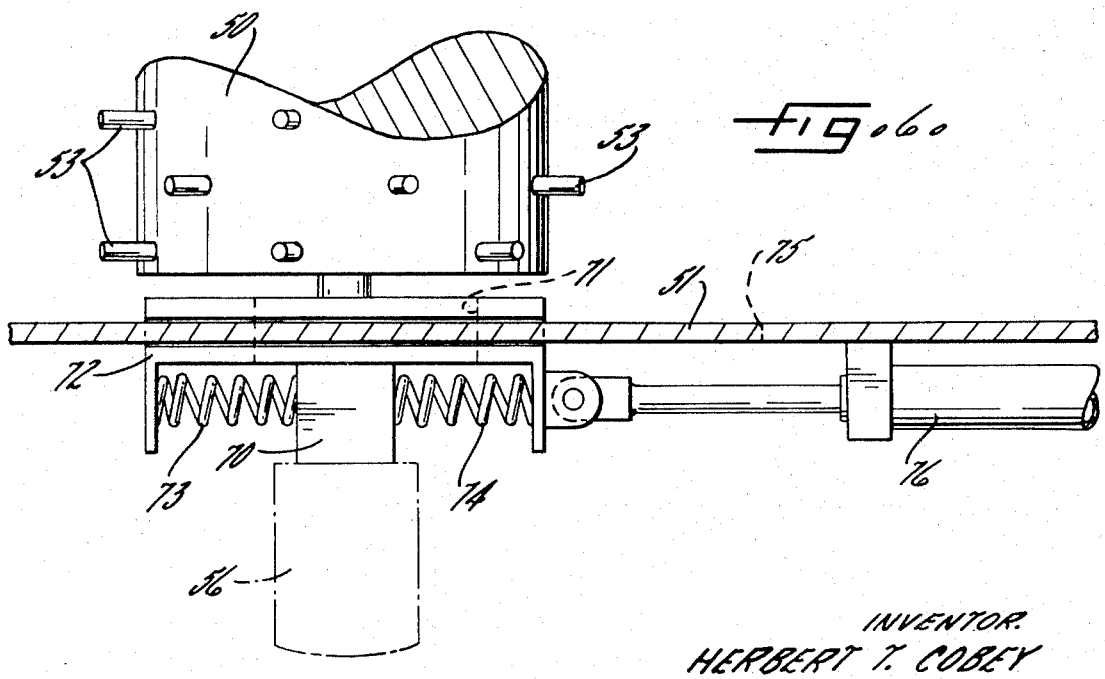

COMPOST AND REFUSE SHREDDING AND SHIFTING APPARATUS

RELATED APPLICATIONS

Herbert T. Cobey, Ser. No. 23,566, filed Mar. 30, 1970, entitled Compost and Refuse Shredding and Shifting Apparatus.

BACKGROUND OF THE INVENTION

The present invention relates generally to the field of waste disposal and composting, and more particularly concerns apparatus for shredding, shifting, and aerating organic wastes, refuse and other materials, such as found at a municipal dump or land fill, to promote more rapid composting of the organic material and more efficient compaction of the other material.

It is well known that garbage and municipal refuse, as well as sewage solids and agricultural wastes contain a high content of organic material, which if properly handled, can be converted in a composting process by bacteria into a non-odorous and valuable product for use as a fertilizer or as a land fill material. It is also recognized that although a certain portion of such municipal refuse and other waste materials cannot be readily composted, it may be broken up or shredded to reduce its volume and therefore permit better compaction when it is used in a land fill operation.

In the past, the various means conventionally utilized to dispose of garbage, refuse and other waste materials have usually involved expensive incineration, sewage treatment or enclosed composting equipment on the one hand, or alternatively involved large, unsightly and inefficient refuse dumps on the other. More recently, however, the problem of waste disposal has been more satisfactorily resolved with high productivity and lower initial operating costs through the use of a rotary drum fragmentizing apparatus of the self-propelled type as disclosed for example in my U.S. Pat. No. 3,369,797 entitled COMPOST TURNER AND WINDROW FORMING MACHINE. This patent discloses a toothed drum mounted for rotation about a horizontally disposed axis. However, the mass or mound of waste material which can be satisfactorily processed by the horizontal drum apparatus has a limitation in that its height can be no greater than the approximate diameter of the drum and the material must be disposed in substantially discrete windrows both before and after each pass of the machine. Since, for practical purposes and from the standpoint of manufacturing costs, such horizontal drums are ordinarily limited to a diameter between 3 and 6 feet and because the windrows of material are usually spaced apart by at least one wheel width of the machine, there are definite limitations on the quantity of refuse material that can be handled within a given area.

Accordingly, it is a primary aim of the present invention to provide an improved apparatus for shredding, shifting and aerating organic waste, refuse and other material, which can economically and efficiently handle much larger quantities of material within a given area than was heretofore possible.

It is a more specific object of the present invention to provide an improved apparatus which does not require that the compost or other refuse material be deposited in the form of windrows before or after the shredding, shifting and aerating thereof by the apparatus of the present invention.

Another object of the invention is to provide a self-propelled apparatus of the above character which, after shredding and aerating the compost and other refuse material lying ahead of the apparatus, shifts the material laterally out of its advancing path.

A more specific object of the invention is to provide an apparatus which not only is capable of the foregoing objects, but which is also capable of digging up, mixing and moving new and existing land fill material more efficiently than a conventional bulldozer, scraper blade and loading apparatus.

Still another specific object of the invention is to provide an apparatus of the above character which shreds, shifts and aerates organic waste, refuse and other material by the interaction of an endless web carrying a plurality of outwardly projecting elements moving in an upwardly and forwardly extending orbital path, in combination with a rotatable drum having elements extending outwardly therefrom positioned forwardly near the lower portion of the orbital path.

These and other objects and advantages of the invention will become more readily apparent upon reading the following detailed description of an illustrative form of the apparatus and upon reference to the attached drawings, in which:

FIG. 1 is a side elevation of the preferred form of the apparatus embodying the present invention;

FIG. 2 is a fragmentary top plan view of the apparatus shown in FIG. 1, with alternate positions of the shredding, shifting and aerating mechanism illustrated in full and dash lines;

FIG. 5 is an enlarged fragmentary illustration of the web of the shredding, shifting and aerating mechanism; and FIG. 6 is a fragmentary view of a portion of shredding, shifting and aerating mechanism, taken generally in the direction of the line 6—6 in FIG. 5.

DETAILED DESCRIPTION OF THE PREFERRED EMBODIMENTS

Figure 3:
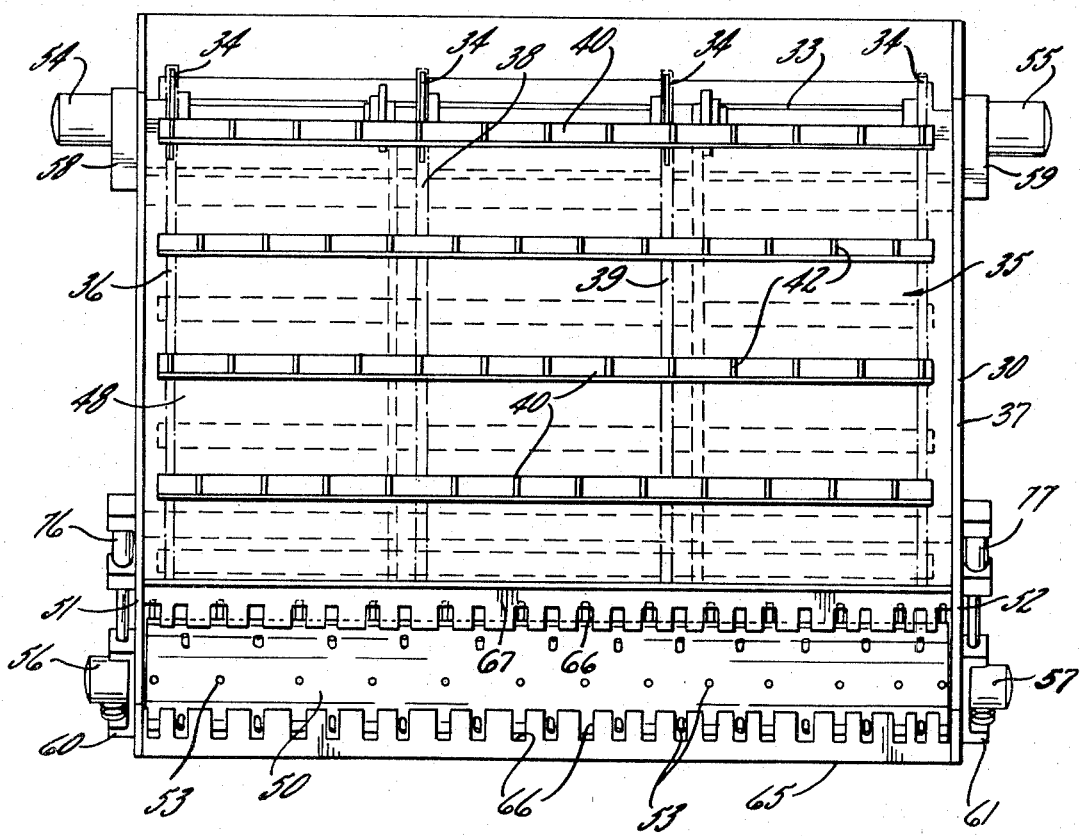
FIG. 3 is a view of the shredding, shifting and aerating mechanism substantially as seen along the line 3—3 in FIG. 1.

Turning now to the drawings, there is shown in FIG. 1 an illustrative apparatus 10 embodying the present invention. In its preferred form, the apparatus 10 includes a self-propelled chassis 11 supported on front and rear wheels 12 and 13, respectively. The chassis 11 also carries an engine 14 for driving the wheels and an operator's cab in which the controls for operating the engine and steering the wheels are located. As illustrated, the chassis 11 is of the articulated type having a vertical pivot 16 adjacent the midpoint thereof for turning the front wheels 12 relative to the rear wheels 13 by means of a steering wheel 17 and a power steering linkage (not shown).

It should be understood that the description thus far is that of a conventional rubber-tired, self-propelled, articulated vehicle and, while this form of vehicle is preferred, other self-propelled vehicles may also be employed with the present invention. Indeed, for some applications a track-type vehicle or a vehicle with a different steering arrangement may actually be desirable.

Mounted on the front end of the chassis 11 and projecting forwardly therefrom is a boom 20. While a single boom is shown it will be appreciated that a pair of laterally spaced boom arms may also be employed if desired. Preferably, the boom 20 is pivotally mounted about a horizontal axis and means are provided for raising and lowering the projecting end of the boom relative to the chassis 11. In the instant embodiment, the boom 20 is pivotally mounted on a pin 21 which extends between a pair of laterally spaced support plates 22 and the projecting end of the boom is raised and lowered by means of a hydraulic cylinder 23.

In the illustrated embodiment, the boom 20 is also mounted for swinging movement about a vertical axis and means are provided for swinging the projecting end of the boom to either side of the longitudinal axis of the chassis 11. To this end, the boom support plates 22 are mounted on a turntable structure 24 and means such as a hydraulic motor and ring gear (not shown) are provided for rotating the turntable. The boom elevating cylinder 23 is, of course, located between the rotating portion of the turntable 24 and the boom 20.

In accordance with the present invention, the apparatus 10 is provided with means for shredding, shifting and aerating organic wastes, refuse and other material located ahead of the chassis as it is propelled forwardly. As shown in FIGS. 1 and 2, a frame 30 is supported by the boom 20 ahead of the chassis 11. Within the frame 30 are mounted upper and lower shafts 31 and 32, respectively, journalled in suitable bearings 33 (see also FIG. 3). Each shaft 31, 32 carries a plurality of pulleys or sprockets 34 spaced laterally along its length and a movable endless web, indicated generally at 35, encircles the sprockets 34 on the upper and lower shafts 31, 32.

The web 35 includes at least a pair of continuous edge loops 36 and 37 and, in the illustrated embodiment, a pair of intermediate loops 38 and 39 interconnected by a plurality of cross bars 40. Each of the loops 36-39 in the illustrated embodiment is formed of a plurality of chain links and the cross bars 40 are substantially L-shaped angle bars with one leg secured to the chain loops 36-39 and the other leg projecting outwardly therefrom. It should be understood, however, that the loops 36-39 could be formed of reinforced belts or metal cables and the cross-bars could form a continuous sheet of impregnated fabric or wire mesh as desired.

Means are provided for orbitally moving the web 35 about the shaft 31 and 32 so as to present an upwardly directed working face defined by the projecting legs of the cross bars for shredding, shifting and aerating compost, refuse and other material as the chassis 11 is propelled ahead. To further enhance the cutting and shredding action of the web 35, a plurality of outwardly projecting teeth 42 may be secured to the cross bars 40, to the loops 36-39 or to the face of the web 35, if it is formed of a continuous material. In the embodiment shown in FIGS. 3 and 5, the teeth 42 are secured, such as by welding, at laterally spaced locations to the angle iron cross bars 40. Preferably, the teeth on each cross bar 40 are disposed in staggered relation to the teeth on the two adjacent cross bars to further enhance the cutting and shredding action. Also while the teeth 42 are shown as blade-like cutting elements in the illustrated embodiment, it will be understood that the teeth could be formed with a cup-shaped cross-section to perform a scooping or digging function as desired.

Figure 4:
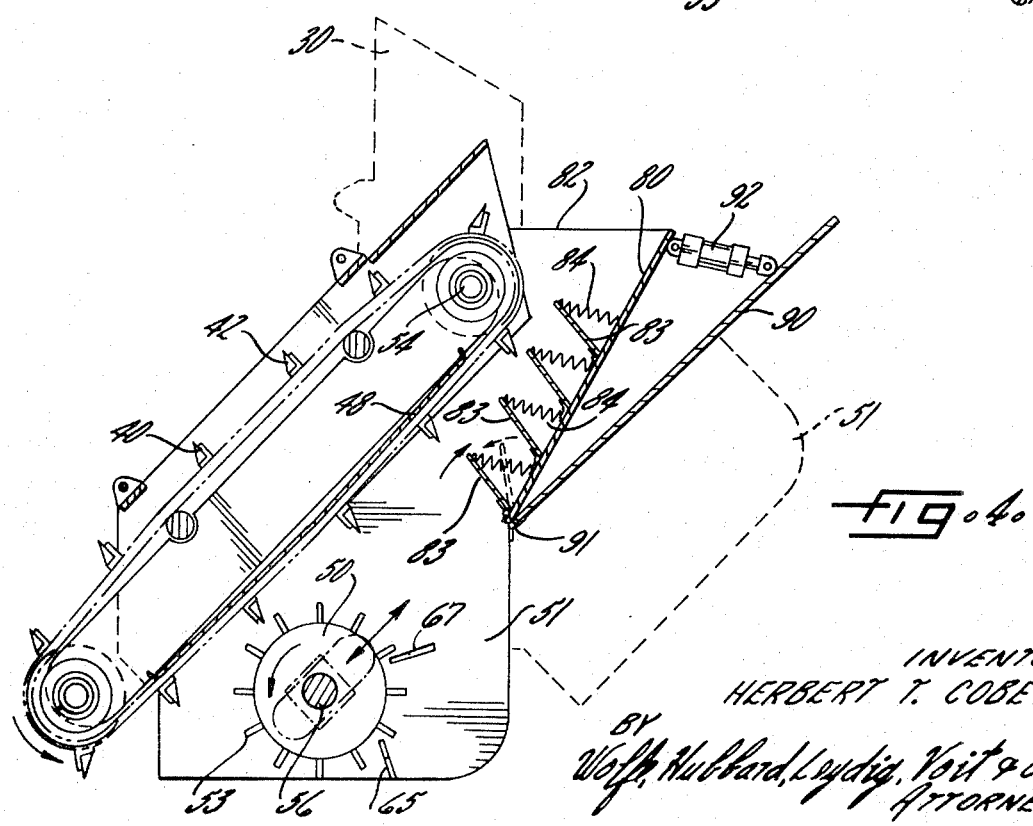
FIG. 4 is an enlarged side view, partially in section, of the shredding, shifting and aerating mechanism.

In further keeping with the invention, the frame 30 is pivotally connected to the boom 20 for movement between a substantially vertical position and a position wherein the frame is inclined upwardly and forwardly at an angle of about 45°. (See for example, the solid and dashed lines of the frame 30 as shown in FIG. 4). Thus, it will be understood that the forwarded reach of the web 35 presents an upwardly directed working face for engaging the refuse material which is shredded, aerated and thrown upwardly and forwardly of the frame 30.

Preferably, the frame 30 is also pivotally connected to the boom 20 for movement between a position substantially transverse to the longitudinal axis of the chassis and a position wherein the frame is angled about 45° in either direction from the transverse position. (See, for example, the positions of the frame shown by the solid and dashed lines in FIG. 2).

Moreover, since this transversely angled position of the frame cuts down on the effective width and because the upwardly inclined angle then causes a lower edge of the frame 30 to be transversely moved relative to the axis of the chassis, the frame may be bodily shifted (to the left as seen in dashed lines in FIG. 2) by swinging the boom 20 to center the lower edge of the frame relative to the axis of the chassis 11. It will be observed that with the frame in this position, the working face of the web 35 is disposed such that it engages and clears all of the compost and refuse material located ahead of the frame 30 out of the path of the wheels 12, 13 of the chassis 11 as it moves forwardly. Also, it is seen that since the material engaged by the web 35 is thrown upwardly, forwardly and to the right or left, the apparatus can make progressive passes across an area substantially completely covered with compost or other refuse material without necessitating placing or leaving the material in windrow form prior to or after the passage of the apparatus. Thus with the present apparatus, a much larger quantity of material can be handled within a given area which of course results in more efficient use of land.

To permit both the above mentioned vertically inclined horizontally angled positions of the frame 30, a connection 45 in the form of a universal joint or the like, is desirably used to interconnect the projecting end of the boom 20 and in the upper portion of the frame 30. A pair of individually controllable double acting hydraulic cylinders 46 and 47 interconnected between the intermediate portion of the boom 20 and points adjacent to the lower corners of the frame 30 may be operated to change the angle of inclination of the frame between the positions described above. (See FIG. 4) In addition, the height of the lower edge of the frame 30 may also be adjusted by raising and lowering the boom 20 through the cylinder 23.

To prevent the compost and refuse material from passing through the open framework of the web defined by the chains 36-39 and cross bars 40 a backing 48 (illustrated in FIG. 4) may be provided behind the upwardly moving reach of the web. The backing plate also serves to prevent excessive deflection of the web 35 between the shafts 31 and 32.

In accordance with another aspect of the present invention, shredding of the refuse and other material is achieved by means acting in combination with the moving web and, in the preferred embodiment, includes a cylindrically shaped shredding drum 50 mounted between side plates 51, 52 attached to opposite sides and forming a part of the frame 30. The shredding drum 50 is positioned forwardly of and adjacent to the lower portion of the orbiting web 35 and has a plurality of outwardly extending elements or teeth 53 attached to its outer circumference. In the illustrative embodiment shown in FIGS. 3 and 4, the teeth are arranged in rows generally parallel to the axis of the drum, with the rows being generally equally spaced from one another around its circumference. The teeth 53 are also generally equidistant from one another within the rows and are staggered relative to the teeth in each of the adjacent rows.

To rotate the drum 50 and to drive the web 35 around its orbital path, hydraulic power is preferably utilized, and in the illustrated embodiment, pairs of hydraulic motors 54–55 and 56–57 are mounted on the sides of the frame 30. Web motors 54 and 55 are connected to the upper shaft 31 through respective gear reduction units 58 and 59, while drum motors 56 and 57 are located at opposite ends of the drum 50 through respective gear reduction units 60 and 61. It will be understood that since the web motors 54 and 55 as well as the drum motors 56 and 57 are located at opposite ends of the shaft 31 and drum 50 respectively, the direction of rotation of one motor must be reversed relative to the other of the pair. Rotation of the shredding drum may either be clockwise or counterclockwise to suit the intended use, and accordingly, drum motors 56 and 57 may be reversing or alternatively, they may be single direction with gear reduction units 60 and 61 having a reversing capability.

In keeping with the present invention, provision is made for cleaning the teeth of the drum during operation by providing one or more restriction plates 65, 67, which are preferably made of spring steel. Each of the plates have a number of slots 66 spaced along their length which permit the teeth 53 of the rotating drum to pass therethrough. Thus, build up of debris or refuse upon the drum is substantially prohibited.

In accordance with yet another aspect of the present invention, the drum is rotatably mounted in floating bearing blocks 70 that are slidably positioned in an elongated slot 71 in a slide bracket 72 and are held in a generally central position in the slot by a pair of opposed springs 73, 74 attached to the slide bracket 72. Thus, the rotating drum is held at a predetermined elevation but is free to move generally vertically relative to the predetermined elevation in the event it strikes a large potentially damaging piece of debris or the like.

The slide brackets 72 are also slidably mounted in a larger rectangular opening 75 in each of the side plates 51 and 52. The position of the slide bracket 72 within the opening is controlled by a pair of hydraulic cylinders 76 and 77, each of which has opposite ends connected to a side plate and the corresponding slide bracket. The direction of slidable movement of both the slide bracket 72 as well as the slidable bearing blocks 70 are in a direction generally parallel to the plane defined by the upwardly moving web, and thus enables the teeth of the web to be maintained in close proximity to the teeth of the drum, while keeping the teeth out of contact with one another.

In further keeping with the present invention, provision is made for limiting or reducing the escape velocity of the refuse or other material being moved by the fast moving web and rotating drum for shortening the trajectory of material thrown by the web. This slowing of the escape velocity is achieved by providing a plate 80 extending transversely across the width of the web forwardly thereof, with the plate being mounted to additional side plates 81, 82 which form a part of the frame 30. Alternatively, the additional side plates 81, 82 can also be an integral part of suitably extended side plates 51 and 52. Mounted on the transverse plate 80 are a number of restriction elements 83 extending rearwardly of the forward plate 80 but out of contact with the teeth of the web. In the illustrative embodiment, the restriction elements 83 are in the form of plates hingedly attached to the transverse plate and normally held generally perpendicular to the plane of the transverse plate by compression springs 84, as shown in FIG. 4. The strength of the springs should be sufficient to limit the escape velocity of the refuse being moved by the web, but not excessively strong so that material would be prohibited from escaping. It should also be understood that the restriction plates 83 may be manufactured from spring steel or other suitable material that would permit deflection, if the force required to deflect such plates was within the limits as set forth above.

Since the transverse plate 80 is rigidly attached to the frame, and keeping in mind that the angular orientation of the web may be varied within a considerable range as is shown in FIG. 4, it is seen that if the web is generally vertically positioned, (as shown in dash lines in FIG. 4) the transverse plate 80 would also be substantially vertical. Since the top of a refuse pile may be higher than the lower end of the transverse plate, an adjustable contact plate 90 is attached forwardly of the transverse plate 80 to compress or ride the top portion of the refuse pile under the transverse plate to engage the moving web, rather than merely be pushed along as the chassis moves forwardly. Since the approach angle of the contact plate 90 varies as the angular position of the web changes, the contact plate has hinges 91 attaching the lower end of the transverse plate 80 to the contact plate and has a hydraulic cylinder 92 interconnecting the top portions of the respective plates. Thus, the approach angle of the contact plate 90 may be varied to correspond with the angular position of the moving web for optimum results.

It will be further understood, of course, that the motors 54–57 as well as the cylinders 23, 46, 47 and 92 are supplied with hydraulic fluid through conventional supply and return lines (not shown) from a hydraulic pump (not shown) under the control of the operator and located on the chassis 11. However, other types of rotary or linear actuators may be used in place of the illustrated motors and cylinders if desired.

The use and operation of the apparatus of the present invention should be clear to those skilled in the art from the foregoing detailed description. Accordingly, only a brief summary of the operation will be presented here.

As will be apparent, the apparatus 10 has particular utility for shredding, aerating and shifting compost, refuse and other materials such as are dumped by trucks in a land fill. Depending upon the depth and composition of the material to be worked upon and the directions of travel and desired discharge, the cylinders 23, 46, 47 and 92 are actuated by the operator to provide the desired height, inclination and angle of the frame 30 as well as the angle of the contact plate 90. Generally, both the vertical inclination and the horizontal angle (to one side or the other) of the frame 30 will be selected within the range of 45°–60° and the depth will be such as to move approximately one layer of deposited material. However, under some circumstances, it may be desirable to position the frame 30 very nearly vertical or in nearly transverse position or both to move the material in a specific direction.

The working faces of the drum 50 engages a portion of the material, debris, refuse and organic wastes, partially shredding it while initially setting it into motion. This material is then moved into contact with the working face of the orbiting web 35 which further shreds this material while moving it upwardly along the plane of the working face of the web. Other of the material not contacted by the drum 50 is also engaged by the web and is also set into motion and shredded as it is moved upwardly by the working face. Thus, it is seen that the lower thickness of the material, which may be more dense due to the compression by the weight of the material above it, is subjected to the working faces of both the drum 50 and the web 35, and thus help insure adequate shredding of their material.

When the working faces of the shredding drum 50 and the web 35 engage the refuse material, the projecting angle bars 40 and teeth 42 of the web and the teeth 53 of the drum 50 dig into the material, lifting, cutting and throwing it upwardly, forwardly and to one side or the other of the line of travel of the chassis (depending, of course, on the position of the frame). This serves to shred, aerate, mix and move the material and thereby speed up the composting of the organic material and the fragmentation of the particulate matter. By repeating this several times at appropriate intervals it will be appreciated that the material is substantially reduced in volume both due to the bacterial action and the elimination of large voids and results in a much more dense and compact land fill.

For convenience and ease of operation the foregoing operation is generally performed on a substantially level area although this is not always necessary. Also in many instances, new refuse material may be deposited along one edge of the area and progressively moved laterally across the area by making successive passes of the apparatus 10 at appropriate intervals. Finally, the process material may be pushed or thrown over the edge of the working area into a ravine or the like that is being filled. In areas where it is required, the apparatus 10 may also be employed to cover newly deposited material with dirt or previously processed material in order to protect the new material from flies and rodents and to cut down on the release of objectionable odors and gases from such materials.

From the foregoing, it will be appreciated that the apparatus of the present invention is very versatile and efficient apparatus for shredding, shifting and aerating compost and other refuse material and for processing and reconstituting new land fill. Other uses of the apparatus of the present invention will doubtlessly also occur to those skilled in the art; and the invention should not be construed or limited to the specific uses and embodiments disclosed or described.

I claim as my invention:

1. An improved apparatus for shredding, shifting and aerating organic waste, refuse and other material comprising, in combination:
   a self-propelled chassis;
   boom means mounted on said chassis and projecting forwardly therefrom;
   a frame supported by said boom means ahead of said chassis;
   upper and lower parallel shafts carried by said frame with said shafts being substantially horizontally disposed;
   a movable endless web encircling said shafts and carrying a plurality of elements projecting outwardly therefrom;
   means for orbitally moving said web about said shafts so as to present an upwardly directed working face defined by said outwardly projecting elements; and
   shredding means carried by said frame ahead of said working face for cooperating with said outwardly projecting elements to shred, shift and aerate said material located ahead of said chassis as said chassis is propelled forwardly.

2. An improved apparatus as defined in claim 1 wherein said shredding means includes an elongated drum rotatably carried by said frame, said drum being substantially horizontally disposed forwardly of said web near said lower shaft and having a plurality of elements projecting outwardly therefrom, and means are provided for rotating said drum.

3. An improved apparatus as defined in claim 1 wherein said outwardly directed drum elements are comprised of radially directed teeth arranged in rows along the length of said drum, said rows being substantially equally spaced from adjacent rows around the circumference thereof, with the teeth in each row being disposed in staggered relation to the teeth in the two adjacent rows.

4. An improved apparatus as defined in claim 2 wherein said frame includes means for vertically adjusting said rotatable drum along a line generally parallel to a plane passing through said upper and lower shafts.

5. An improved apparatus as defined in claim 3 wherein said rotatable drum is journaled in movable bearing blocks normally biased to a neutral position by spring means and shiftable against said bias in the event said drum encounters an obstruction.

6. An improved apparatus as defined in claim 4 wherein said bearing blocks and spring means are mounted on said brackets and means are provided for selectively adjusting said slide brackets relative to said frame.

7. An improved apparatus as defined in claim 1 wherein said shredding means includes a generally flat plate spaced forwardly of the upwardly moving portion of said web, said plate extending substantially the width of said web and having a number of resiliently mounted restriction elements thereon extending rearwardly out of contact with said web for increasing the shredding and limiting the flight of material being moved by said moving web.

8. An improved apparatus as defined in claim 7 wherein said restriction elements are plates hingedly mounted on said flat plate, said restriction plates having a spring means for normally biasing said hinged restriction plates outwardly from said flat plate when no material is passing between said web and flat plate.

9. An improved apparatus as defined in claim 7 wherein said restriction plates are resilient and deflectable such that said restriction plates will bend when struck by said moving material to thereby allow said material to escape while limiting the escape velocity.

10. An improved apparatus as defined in claim 1 wherein said frame includes an angularly adjustable contact plate mounted forwardly thereof for compressing a portion of said material as said apparatus moves forwardly.

11. An improved method for shredding, shifting and aerating organic waste, refuse and other material, comprising:
   advancing a surface engaging chassis across a surface on which organic waste, refuse and other material is located, said chassis supporting a frame ahead of said chassis, said frame carrying upper and lower generally horizontal shafts;
   orbiting an endless web having outwardly projecting elements thereon about said upper and lower shafts so that said elements present an upwardly and forwardly directed working face; and
   engaging said material with said working face whereby said material is shredded, shifted and aerated as said chassis advances across said surface.

12. An improved method as defined in claim 11 including the step of angling said working face at an intermediate angle between 0° and 90° to either side of the line of relative movement between said working face and said material.

13. An improved method as defined in claim 12 wherein said angle is selected in the range of 30°–60°.

14. An improved method as defined in claim 11 and the step of subjecting said material to additional shredding action by engaging said material with shredding means positioned forwardly of said working face and in cooperative relationship thereto.

15. An improved method as defined in claim 14 wherein said material is initially subjected to the shredding action of a rotating drum, having outwardly projecting elements thereon, located forwardly and adjacent the lower edge of said working face.

16. An improved method as defined in claim 14 wherein said material passes upwardly between said working face and one or more restricting elements projecting substantially rearwardly toward said working face.

17. An improved method as defined in claim 11 wherein said material has been previously dumped at a landfill site and said orbiting web is progressively moved across said landfill site in engagement with said material.

18. An improved method as defined in claim 17 wherein said material is subjected to several engagements with said orbiting web at periodic intervals.

19. An improved method as defined in claim 17 wherein said orbiting web is laterally angled relative to its direction of movement across said landfill site so as to laterally shift said material upon engagement with said web.

20. An improved method for shredding, shifting and aerating material such as organic waste, refuse and other debris, comprising the steps of:
   rotating a cylindrical drum having outwardly projecting elements thereon for engaging at least a portion of said material, said shredding means being operable to initially set said portion of material into motion and to partially shred it;
   orbiting an endless web, having outwardly projecting elements thereon, about upper and lower generally horizontal shafts, to present a generally upwardly and forwardly directed working face for further shredding said material previously set in motion and for engaging other of said material not previously set in motion, said orbiting web being operable to shred and aerate said material and to throw it generally upwardly and forwardly of said web.

* * * * *